June 12, 1956 R. A. FRYKLUND 2,750,574

ECHO-RANGING DEVICES

Filed April 15, 1953 2 Sheets-Sheet 1

INVENTOR
ROBERT A. FRYKLUND
BY [signature]
ATTORNEY

June 12, 1956 R. A. FRYKLUND 2,750,574

ECHO-RANGING DEVICES

Filed April 15, 1953 2 Sheets-Sheet 2

INVENTOR
ROBERT A. FRYKLUND
BY Elmer J. Gorn
ATTORNEY 2,750,574

ECHO-RANGING DEVICES

Robert A. Fryklund, Dedham, Mass., assignor to Raytheon Manufacturing Company, Newton, Mass., a corporation of Delaware Application April 15, 1953, Serial No. 348,865

6 Claims. (Cl. 340—3)

This invention relates to pulse echo distance-measuring devices and more particularly to a keying system found to be desirable in sonic depth sounding equipment.

In sonic depth sounding equipment, which is to be used for inland waterways primarily for navigational purposes, the range required is relatively short, for example, on the order of eighty feet, but it is desirable that the soundings be obtained as rapidly as possible. Accordingly, the sonic transmitter is keyed as often as is possible for the desired maximum range. For example, when the desired maximum range is on the order of eighty feet, the system would be keyed on the order of 1800 times per minute. In previous systems wherein mechanical contacts were used to key the system, wear of the contacts caused a change in the zero triggering position, and, hence, introduced an error into the depth indications displayed by the device.

This invention discloses a keying system wherein the movable keying elements are the plates of a condenser and do not contact each other. Hence, there is no wear and, hence, substantially no change in the zero setting.

This invention further discloses a particular electronic circuit useful for transforming the output wave shape of the condenser to a useful keying pulse. Briefly, this is accomplished by connecting the movable plate of the condenser to ground, connecting the stationary plate of the condenser to a voltage source through an impedance and coupling the stationary plate to the grid of a thyratron whose output is used to synchronize the quench rate of a self-quenching oscillator whose output is used to drive the transducer.

This invention further discloses a particular housing arrangement for the electronic components of the system comprising a case having a hinged cover to which is attached the indicator scale. Hinged to the cover is a support plate carrying the mechanical components of the keying and indicating system such that all components of the system are readily accessible by opening the hinged cover and swinging open the plate support.

Other and further objects and advantages of this invention will become apparent as the description thereof progresses, reference being had to the accompanying drawings wherein.

Figure 2:
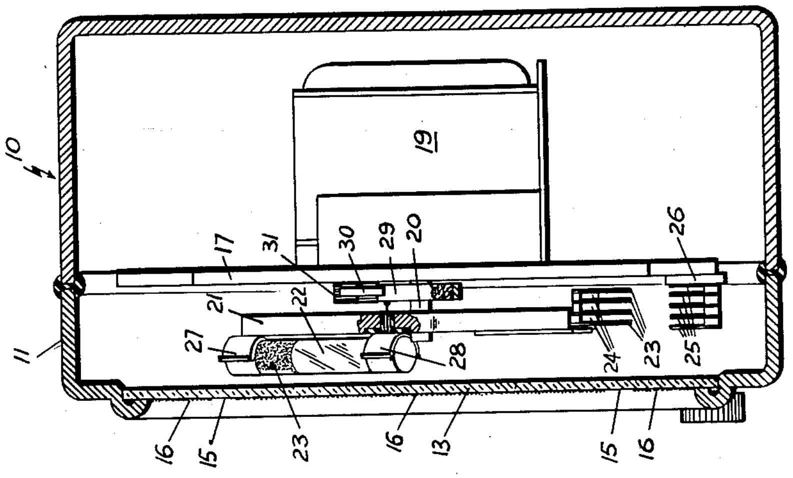
Fig. 2 illustrates a partial cross-sectional top plan view of the device shown in Fig. 1.
Figure 1:
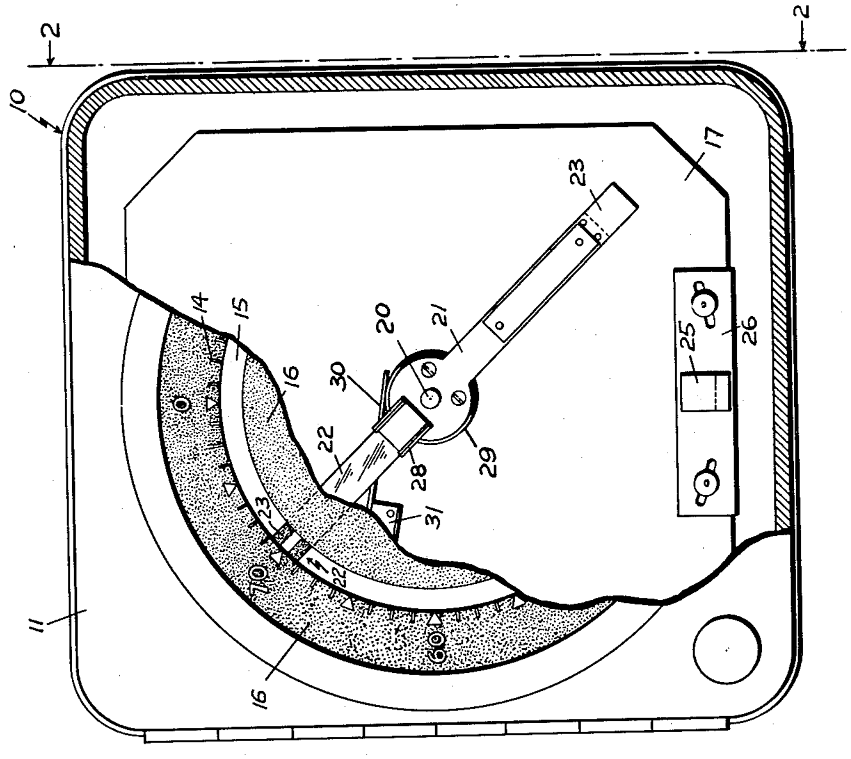
Fig. 1 illustrates a partially broken away front elevation view of the indicator components of a system embodying this invention.
Figure 3:
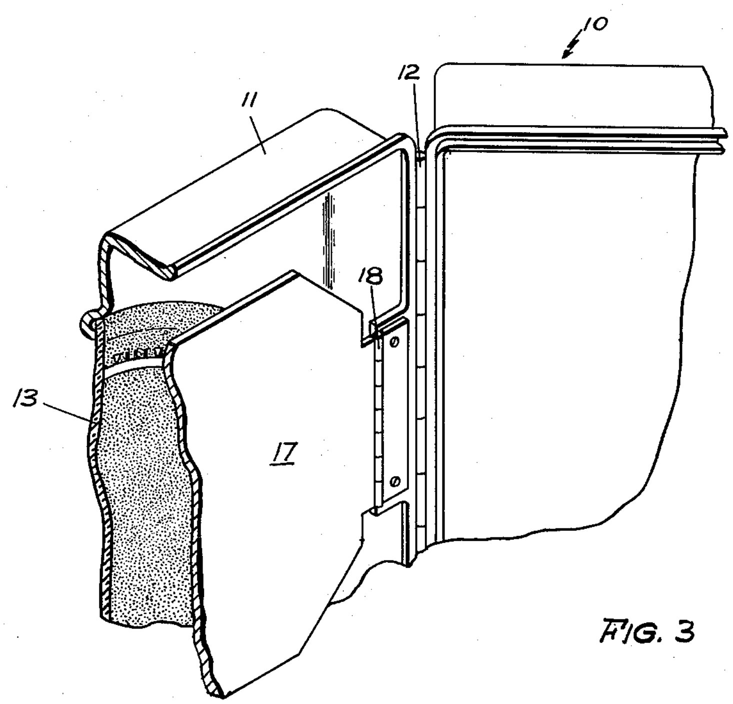
Fig. 3 is a partially broken away perspective view illustrating details of the hinged support structure utilized by the device illustrated in Figs. 1 and 2.

Referring now to Figs. 1 through 3, there is shown a case structure 10 containing the mechanical elements of a keyer and indicator system of an echo-ranging device. Case 10 is substantially oblong in shape and may be made, for example, in the form of a metal stamping or casting. Case 10 has a cover 11 attached to case 10 by a hinge 12. The front of cover 11 contains a circular portion of glass 13. Glass 13 contains around the periphery thereof scale numbers 14 indicative of the depth of the water body being measured by the depth sounder system utilizing this particular keyer and indicator system. Positioned inside the ring of numbers is an annular transparent section 15, the remainder of the glass being rendered substantially opaque by a material, such as paint 16.

Positioned behind the cover 11 is a support plate 17, which is hinged to cover 11 by means of a hinge 18. Plate 17 may be fastened in position with respect to cover 11 such that it is parallel to the glass portion 13 in cover 11 by means of thumb screws, not shown. Attached to plate 17 is a motor 19. Motor 19 is positioned behind plate 17 and has the shaft 20 thereof extending outwardly through an aperture in the plate 17. Rigidly attached to shaft 20 is an arm 21 which, as shown here, is pivoted substantially transversely about its mid-point on shaft 20. Fastened to one end of arm 21 is a neon indicator lamp 22, which is in registry with the annular transparent section 15 of the glass 13. The lamp 22 is covered with opaque material, as at 23, for all portions visible through glass ring 15, except a thin radially extending slit thereof appearing behind the transparent portion 15.

Attached to the other end of arm 21 is a plurality of flat conductive plates 23 which serve as the movable plates of a condenser. Plates 23 are positioned parallel to the support member 17 and are spaced by means of spacers 24. Since the plates 23 and spacers 24, as well as the arm 21 and shaft 20, are conductive, the plates 23 are effectively grounded through the motor 19. Plates 23 are adapted to pass between a plurality of stationary plates 25 insulatedly supported at the bottom of plate 17 by an insulating support member 26.

Support member 26 is attached to plate 17 by means of a screw passing through slotted holes in member 26 such that the position of the plates 25 may be varied somewhat to thereby vary the time at which the condenser plates 23 pass between the plates 25. In general, this adjustment will be made such that the keying pulse produced by the condenser, using plates 23 and 25, occurs substantially at the time the neon lamp 22 passes the zero mark at the top of the scale. It may be noted that, since the condenser plates 23 are at the opposite end of the rod 21 from the lamp 22, a balanced structure may be obtained, which may be rotated at high speeds without any substantial vibrations.

In order to supply an indicating signal to the lamp 22, the outer end thereof, which constitutes one terminal of the lamp, is connected through a metallic clamp 27 to the arm 21 and, hence, to ground through the motor 19. The other end of the lamp 22 is attached to a metallic clamp 28 insulatedly mounted on arm 21 and connected to a slip ring 29 insulatedly mounted on shaft 20, behind arm 21. A metallic brush 30 engages slip ring 29 and is insulatedly mounted as at 31 on support plate 17. Application of the desired signal to the brush 30 connects the signal across the lamp 21, thereby producing illumination thereof.

Figure 4:
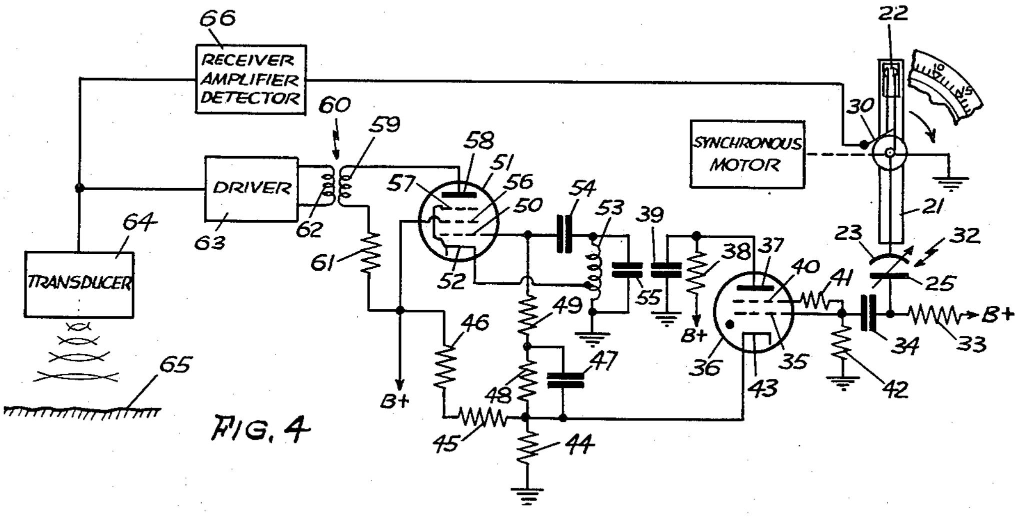
Fig. 4 is a schematic diagram of a system embodying this invention.

Referring now to Fig. 4, there is shown a diagram of a system utilizing the keyer and indicator structure illustrated in Figs. 1 through 3. The movable plate 23 of the condenser 32 is connected to ground through the arm 21. The stationary plate 25 of the condenser 32 is connected to a B+ through a resistor 33 and through a condenser 34 to the grid 35 of a thyratron 36 whose anode 37 is connected to B+ through a quenching resistor 38 and to ground through a charged dumping condenser 39. The screen grid 40 of thyratron 36 is connected to the grid 35 through a current-limiting resistor 41, and the grid 35 is, in turn, connected to ground through a grid-load resistor 42. The cathode 43 of thyratron 46 is connected to ground through a cathode load resistor 44, and to B+ through bleeder bias resistors 45 and 46 in series. Cathode 43 is also connected through a condenser 47 in parallel with a resistor 48 in series with a resistor 49 to the grid 50 of the self-quenching oscillator tube 51. The cathode 52 of tube 51 is connected to a tap on an inductor 53, one end of which is grounded and the other end of which is connected through a condenser 54 to grid 50. Inductor 53 is resonated at the desired oscillation frequency of the tube 51 by a condenser 55 in parallel with inductor 53. The screen grid 56 of tube 51 is connected to B+. The suppressor 57 of tube 51 is connected to the cathode 52 and the plate 58 thereof is connected through the primary winding 59 of the transformer 60 and a resistor 61 in series to B+.

The secondary winding 62 of transformer 60 feeds a driver 63, which may be, for example, a pair of power amplifier tubes fed in push-pull. The output of the driver 63 is fed to a transducer 64, which may be, for example, of the magnetostrictive or crystal type and preferably is made substantially resonant at the oscillation frequency of the tube 51. The transducer 64 projects sound waves downwardly toward the bottom 65 of the water body, whose depth is to be measured, and the returning echo signals are picked up by the transducer and fed through a receiver amplifier detector 66 to the brush 30 feeding the neon lamp 22.

In operation, the meshing of the plates 23 of the condenser 32 with the plate 25 causes the capacity thereof to increase. As a result, the condenser 32 charges through the resistor 33, causing a negative voltage to be applied to the grid 35 of tube 36 as the condenser 33 is increasing in capacity. However, as soon as the plates have become completely engaged and start to disengage, the capacity of condenser 32 decreases, causing a positive voltage to be applied to the grid 35 of the thyratron 36 through the condenser 34, thereby firing the thyratron. The thyratron 36 is subsequently extinguished due to the fact that the condenser 39 in the plate circuit thereof discharges rapidly to a potential below the sustaining potential of the thyratron, and the resistor 38 is sufficiently large to prevent a discharge sustaining current to be drawn therethrough. By suitable adjustment of the size of the condenser 39 and resistor 38, the duration of the firing to thyratron 36 may be made on the order of a millisecond or less. Firing of the thyratron 36 causes a positive pulse to be applied to the grid 50 of the oscillator tube 51, thereby causing the oscillator tube 51 to burst into oscillations. These oscillations rapidly build up in amplitude until grid current is drawn, charging condenser 54 to a point where the grid 50 is biased sufficiently far below cutoff of the tube 51 to extinguish the oscillator. The condenser 54 discharges through the resistors 48 and 49 and the resistor 44 to a point where oscillations may again occur by the tube 51. The size of the resistor 48 and condenser 54 are adjusted such that the free-running quench rate, that is, the rate at which bursts of oscillation would be produced by the oscillator 51, is somewhat less than the repetition rate of the pulse output of the thyratron 36. As a result, the bursts of oscillation produced by the oscillator 51 are synchronized with the triggering of thyratron 36, and, therefore, the burst of oscillations may be fed to the transducer 64 substantially at the time the indicator lamp 22 passes the zero position on the scale. The regenerative feedback of the oscillator 51 is sufficiently great to allow the oscillator to block after a few hundred cycles or less of oscillations have occurred, such that if the oscillator is operating in a supersonic range, as is usually the case, the length of the burst of oscillations is on the order of a few milliseconds. This initial burst of oscillations appears on the lamp 22 and gives an indication which may be used for zero adjustment of the position of the stationary plates 25 of the condenser 32.

This completes the description of the particular embodiment of the invention illustrated herein. However, many modifications thereof will be apparent to persons skilled in the art without departing from the spirit and scope of this invention. For example, other types of oscillator driver circuits could be used and other types of indicators besides the lamp 32, such as permanent record indicators wherein marks are made on the sensitive paper indicative of echo signals, could be used with the condenser keying arrangement illustrated herein. Accordingly, it is desired that this invention be not limited by the particular details of the species illustrated herein except as defined in the appended claims.

What is claimed is:

1. A pulse echo system comprising a source of energy to be transmitted, a keying system for said source comprising a mechanically variable condenser, and an indicator for said pulse echo system having a movable element mechanically ganged to said condenser, which indicator is adapted to indicate the presence of reflected energy caused by said transmitted energy.

2. A pulse echo system comprising a source of energy to be transmitted, a keying system for said source comprising a mechanically variable condenser, and a visual indicator for said pulse echo system having a movable element mechanically ganged to said condenser, which indicator is adapted to indicate the presence of reflected energy caused by said transmitted energy.

3. An echo-ranging system comprising a source of energy to be transmitted, a keying system for said source comprising a mechanically variable condenser, and an indicator for said pulse echo system having a movable element mechanically ganged to said condenser, which indicator is adapted to indicate the presence of reflected energy caused by said transmitted energy.

4. An echo-ranging system comprising a source of energy to be transmitted, a keying system for said source comprising a mechanically variable condenser, and a visual indicator for said pulse echo system having a movable element mechanically ganged to said condenser, which indicator is adapted to indicate the presence of reflected energy caused by said transmitted energy.

5. A pulse echo system comprsing a source of energy to be transmitted, a keying system for said source comprising a mechanically variable condenser, a stationary plate of said condenser being coupled to a voltage source through a charging impedance and coupled to the control grid of a grid-controlled gaseous discharge device, a movable plate of said condenser being grounded, and an indicator for said pulse echo system ganged to said condenser, which indicator is adapted to indicate the presence of reflected energy caused by said transmitted energy.

6. A pulse echo system comprising a source of energy to be transmitted, a keying system for said source comprising a mechanically variable condenser, a stationary plate of said condenser being coupled to a voltage source through a charging impedance and coupled to the control grid of a grid-controlled gaseous discharge device, a movable plate of said condenser being grounded and being attached to apparatus for periodically moving said movable plate past said stationary plate, and an indicator for said pulse echo system ganged to said condenser, which indicator is adapted to indicate the presence of reflected energy caused by said transmitted energy.

References Cited in the file of this patent

UNITED STATES PATENTS 2,371,988 Granqvist ---------------- Mar. 20, 1945
2,518,324 Hurley ------------------ Aug. 8, 1950